United States Patent
Marques et al.

(10) Patent No.: US 10,995,658 B2
(45) Date of Patent: May 4, 2021

(54) EXHAUST GAS TURBOCHARGER SYSTEM FOR A MULTI-ROW INTERNAL COMBUSTION ENGINE AND METHOD FOR OPERATING AN EXHAUST GAS TURBOCHARGER SYSTEM

(71) Applicant: Dr. Ing. h.c. F. Porsche Aktiengesellschaft, Stuttgart (DE)

(72) Inventors: Marcos Remedios Marques, Wurmberg (DE); Peter Rothenberger, Philippsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/031,077

(22) Filed: Jul. 10, 2018

(65) Prior Publication Data
US 2019/0010861 A1    Jan. 10, 2019

(30) Foreign Application Priority Data

Jul. 10, 2017 (DE) .................... 10 2017 115 349.7

(51) Int. Cl.
*F02B 37/16* (2006.01)
*F02B 37/00* (2006.01)
(Continued)

(52) U.S. Cl.
CPC ............ *F02B 37/16* (2013.01); *F02B 37/001* (2013.01); *F02B 37/007* (2013.01); *F02B 37/10* (2013.01);
(Continued)

(58) Field of Classification Search
CPC ...... F02B 37/16; F02B 37/001; F02B 37/002; F02B 37/10; F02B 37/007; F02B 37/225; F02B 2037/122; Y02T 10/12
See application file for complete search history.

(56) References Cited

U.S. PATENT DOCUMENTS 5,003,781 A * 4/1991 Shibata ................... F01N 1/166
181/226
5,551,236 A * 9/1996 Zimmer ................... F02B 37/16
60/605.1

(Continued)

FOREIGN PATENT DOCUMENTS

DE    102015211438 A1 * 12/2016  ............ F02B 37/007
EP    3 059 427          8/2016
(Continued)

OTHER PUBLICATIONS

DE-102015211438-A1, Smiljanovski, Pub Dec. 2016—English Translation (Year: 2016).*

(Continued)

*Primary Examiner* — Jesse S Bogue
(74) *Attorney, Agent, or Firm* — Gerald E. Hespos; Michael J. Porco; Matthew T. Hespos

(57) ABSTRACT

An exhaust gas turbocharger system (1) has a first and second exhaust gas turbochargers (2, 3) arranged in parallel. Each exhaust gas turbocharger (2, 3) has an exhaust gas turbine (20, 30) and a compressor (21, 31). Fresh air compressed by the compressor (21) of the first exhaust gas turbocharger (2) can flow into a first pressure line (15), and fresh air compressed by the compressor (31) of the second exhaust gas turbocharger (3) can flow into a second pressure line (16). The two pressure lines (15, 16) are connected to each other in terms of flow. An electric drive device (10) is connected to the first exhaust gas turbocharger (2) and can be turned on for providing additional torque for driving the exhaust gas turbine (20) and the compressor (21) of the first exhaust gas turbocharger (2).

7 Claims, 1 Drawing Sheet

(51) Int. Cl.
*F02B 37/22* (2006.01)
*F02B 37/10* (2006.01)
*F02B 37/007* (2006.01)
*F02B 37/12* (2006.01)

(52) U.S. Cl.
CPC ...... *F02B 37/225* (2013.01); *F02B 2037/122* (2013.01)

(56) References Cited

U.S. PATENT DOCUMENTS

| | | | | |
|---|---|---|---|---|
| 5,706,790 | A * | 1/1998 | Kemmler | F01N 3/22 123/564 |
| 9,574,526 | B2 * | 2/2017 | Takaki | F02D 41/0077 |
| 2005/0132705 | A1 * | 6/2005 | Boley | F02B 37/16 60/605.1 |
| 2007/0130948 | A1 * | 6/2007 | Boehm | F02B 37/18 60/612 |
| 2010/0281862 | A1 * | 11/2010 | Shiraishi | F02B 37/16 60/600 |
| 2011/0010072 | A1 * | 1/2011 | Burkhardt | F02D 23/00 701/102 |
| 2011/0232279 | A1 * | 9/2011 | Zielke | F01N 3/0231 60/600 |
| 2013/0167528 | A1 * | 7/2013 | Schlund | F02B 47/08 60/612 |
| 2016/0010539 | A1 * | 1/2016 | Verdoorn | F02D 13/0242 60/600 |
| 2016/0138491 | A1 * | 5/2016 | Casal Kulzer | F02D 13/0257 60/612 |
| 2018/0045101 | A1 * | 2/2018 | Turner | F02B 37/12 |

FOREIGN PATENT DOCUMENTS

| | | | | |
|---|---|---|---|---|
| EP | 3 103 991 | | 12/2016 | |
| GB | 2 442 794 | | 4/2008 | |
| JP | 03199626 | A * | 8/1991 | ............ F02B 37/002 |
| JP | 04054218 | A * | 2/1992 | ............ F20B 39/10 |
| JP | 7-42567 | | 2/1995 | |
| JP | 07042567 | A * | 2/1995 | ............ F20B 37/007 |
| JP | 2005-344633 | | 12/2005 | |
| WO | WO-2012152457 | A1 * | 11/2012 | ............ F02B 37/002 |

OTHER PUBLICATIONS

JP-04054218-A Takeuchi English Translation Pub Feb. 1992 (Year: 1992).*

German Examination Report dated Jun. 13, 2018.

* cited by examiner

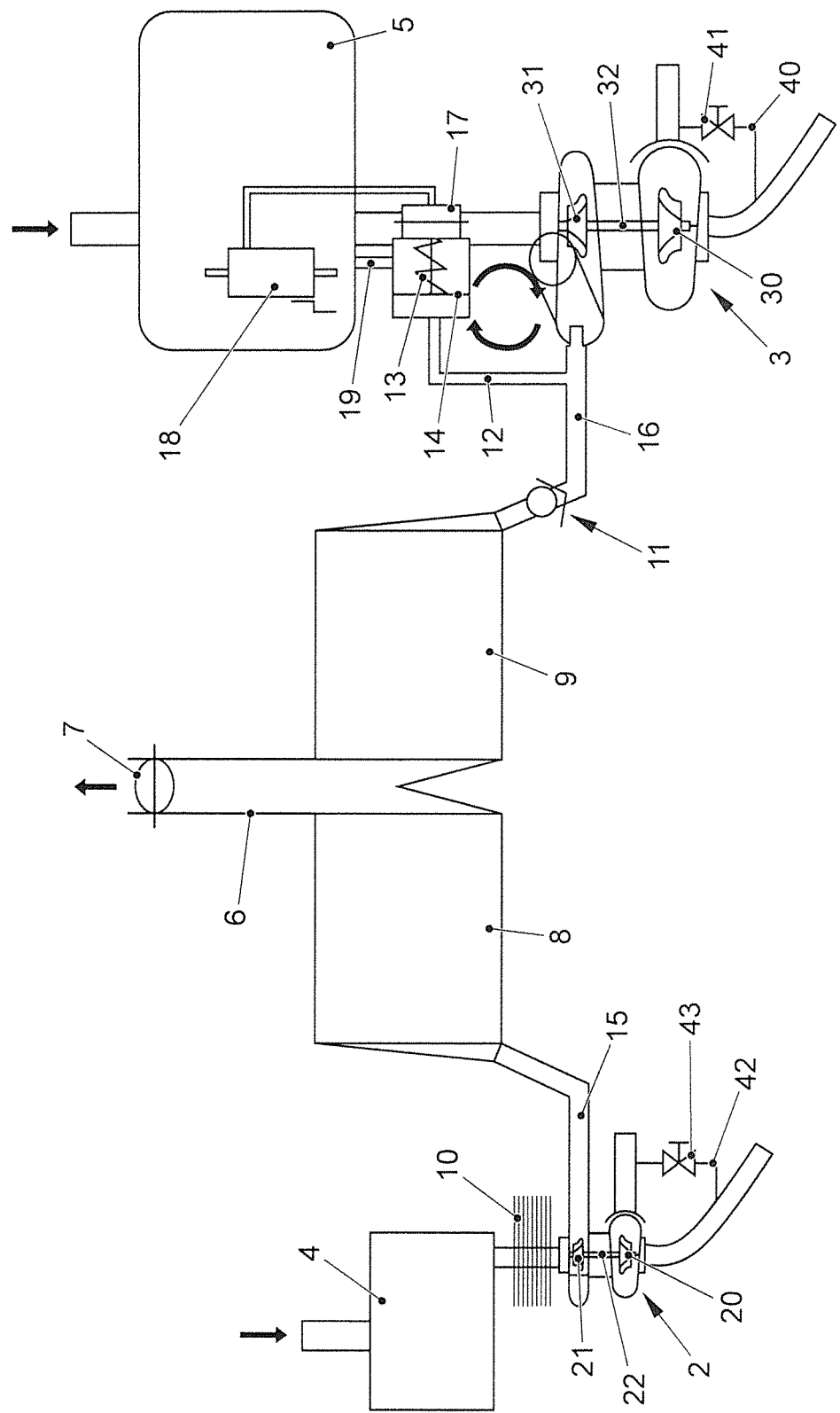

EXHAUST GAS TURBOCHARGER SYSTEM FOR A MULTI-ROW INTERNAL COMBUSTION ENGINE AND METHOD FOR OPERATING AN EXHAUST GAS TURBOCHARGER SYSTEM

CROSS REFERENCE TO RELATED APPLICATION

This application claims priority under 35 USC 119 to German Patent Appl. No. 10 2017 115 349.7 filed on Jul. 10, 2017, the entire disclosure of which is incorporated herein by reference.

BACKGROUND

Field of the Invention

The invention relates to an exhaust gas turbocharger system for a multi-row internal combustion engine, comprising a first exhaust gas turbocharger and at least one second exhaust gas turbocharger that are arranged parallel to each other. Each of the exhaust gas turbochargers has an exhaust gas turbine and a compressor connected to the exhaust gas turbine for compressing sucked-in fresh air. A first pressure line is connected on the outlet side to the compressor of the first exhaust gas turbocharger so that the fresh air compressed by that compressor can flow into the first pressure line. At least one second pressure line is connected on the outlet side to the compressor of the second exhaust gas turbocharger so that the fresh air compressed by that compressor can flow into the second pressure line. The two pressure lines are connected to each other in terms of flow. The invention relates to a method for operating an exhaust gas turbocharger system.

Related Art

Exhaust gas turbo supercharging plays a very important role in the development of internal combustion engines. The reasons for this include the increased requirements for improved efficiency, a reduction in emissions and an increase in power. To reduce fuel consumption and the $CO_2$ emissions of internal combustion engines, development tendencies tend ever more in the direction of reducing the swept volume of internal combustion engines, which frequently is referred to as "downsizing". This results in more widespread use of exhaust gas turbochargers to achieve correspondingly high specific powers.

Downsizing of internal combustion engines with a simultaneous demand for greater engine power and higher torque at low rotational speeds of the internal combustion engines—frequently also referred to as "low-end-torque range"—requires ever higher charging pressures. However, higher charging pressures are associated with increasing specific fuel consumption. With these preconditions, a conflict of objectives arises in the structural configuration of the exhaust gas turbine of an exhaust gas turbocharger between the fuel consumption at a nominal power, on the one hand, and the response behaviour, in particular the build-up of torque in the event of a load jump at low and average rotational speeds, on the other hand. As a rule, low full load consumption requires an exhaust gas turbine with relatively large turbine cross sections and correspondingly large and relatively heavy turbine wheels. However, this approach leads to a significantly worse response behaviour. The above-explained conflict of targets can be partially overcome by sequential supercharging or at least two-stage supercharging, in which two (or more) exhaust gas turbochargers are connected one behind another in series.

An alternative for being able to at least partially avoid this conflict of objectives is provided by a supercharging concept with an additional, purely electrically driven compressor. For example, EP 3 103 991 A1 discloses a supercharging concept for an internal combustion engine, in which an exhaust gas turbocharger and a purely electrically driven compressor are provided. A nonreturn valve is arranged between the compressor and a charge air cooler.

A further alternative supercharging concept is formed by electrically assisted exhaust gas turbo supercharging, in which the exhaust gas turbochargers of an internal combustion engine have an additional electric drive device to generate additional torque at low rotational speeds of the internal combustion engine. The electric drive device can be switched on for driving the exhaust gas turbochargers. However, it has been shown that the electrically assisted exhaust gas turbo supercharging in the case of multi-row internal combustion engines that have plural exhaust gas turbochargers provides only a very low potential for improvement in respect of the response behaviour of the internal combustion engine because of the limited maximum electrical power that is available.

It is therefore an object of the invention to provide an exhaust gas turbocharger system of the type mentioned above for a multi-row internal combustion engine that permits an improved response behaviour at low rotational speeds of the internal combustion engine and is designed simply and cost-effectively. It is furthermore the object of the invention to provide a method for operating an exhaust gas turbocharger system that permits an improved response behaviour of the internal combustion engine at low rotational speeds.

SUMMARY

The invention relates to an exhaust gas turbocharger system with an electric drive device that can be switched on and is connected to the first exhaust gas turbocharger for providing an additional torque for driving the exhaust gas turbine and the compressor of the first exhaust gas turbocharger. A valve is arranged within the second pressure line and is configured for separating the flow connection between the two pressure lines when the electric drive device is switched on. A bypass air line branches off from the second pressure line on the outlet side downstream of the compressor of the second exhaust gas turbocharger and has a switchable bypass air valve. The exhaust gas turbocharger system of the invention operates only one of the (at least) two exhaust gas turbochargers with electrical assistance from an electric drive device. The electric drive device can be switched on at low rotational speeds of the internal combustion engine and can generate a torque that can additionally drive the rotational movements of the exhaust gas turbine of the first exhaust gas turbocharger and the compressor connected to the exhaust gas turbine of the first exhaust gas turbocharger. In this operating state, the valve is closed and therefore completely decouples the compressor of the second exhaust gas turbocharger from the supercharging process. During this operating state, the invention avoids having the compressor of the second exhaust gas turbocharger build up a charging pressure against the closed valve and avoids pumping a mass flow of zero in an extreme manner. More particularly, the second exhaust gas turbocharger is assigned a bypass air line that branches off from the second pressure line on the outlet side downstream of the compressor of the second exhaust gas turbocharger and has a switchable bypass air valve that is opened for a bypass air mode of the compressor of the second exhaust gas turbocharger when the valve means is closed. At high rotational speeds of the internal combustion engine, the electric drive device of the first exhaust gas turbocharger is, by contrast, no longer energized and is therefore passive. The compressor of the second exhaust gas turbocharger then is switched on again, by opening of the valve in the second pressure line and closing the bypass air valve, and then contributes again to the supercharging process. The exhaust gas turbocharger system, therefore, provides the advantage of a considerable cost saving, since only one of the exhaust gas turbochargers of the multi-row internal combustion engine is designed to be assisted electrically and accordingly has an electric drive device. A further advantage is that the undesirable pumping of the compressor of the second exhaust gas turbocharger, which is not electrically assisted, can be prevented by opening the bypass air valve when the compressor is decoupled from the supercharging process by closing the valve means.

In one embodiment, the valve is a nonreturn valve. The nonreturn valve is configured for automatically closing if, when the electric drive device is activated, the charging pressure generated by the first electrically assisted exhaust gas turbocharger is higher than the charging pressure generated by the second exhaust gas turbocharger, which is not electrically assisted.

In an alternative embodiment, the valve may be a compressor switch-on valve. Closing the compressor switch-on valve decouples the compressor of the second exhaust gas turbocharger from the supercharging process of the internal combustion engine if the electric drive device of the first exhaust gas turbocharger is activated and assists the operation thereof.

A setting means for setting the flow cross section may be arranged in the bypass air line. The setting means may configured to limit the charging pressure of the second exhaust gas turbocharger during high acceleration of the second exhaust gas turbocharger and when the bypass air valve is open, so that the charging pressure lies below a pumping limit of the compressor of the second exhaust gas turbocharger. An undesirable pumping of the compressor of the second exhaust gas turbocharger, which has a negative effect on the production of noise and the service life of the components of the second exhaust gas turbocharger, can therefore prevented.

The setting means for setting the flow cross section may be an aperture that has a fixed or a variable flow cross section. An aperture with a fixed flow cross section has the advantage of being able to be produced particularly simply and cost effectively. Although an aperture with a variable flow cross section is, by contrast, more expensive, it affords advantages to the effect that the flow cross section can be adapted to different circumstances and external boundary conditions.

The bypass air valve can comprise an actuating means configured for selectively opening or closing the bypass air valve. The actuating means can be pneumatically or electrically operable.

The invention also relates to a method for operating an exhaust gas turbocharger system. The method is carried out so that when the electric drive device of the first exhaust gas turbocharger is switched on, the valve means for separating the flow connection between the two pressure lines is closed and the bypass air valve is opened. The method permits an improved response behaviour of the internal combustion engine at low rotational speeds.

The method may be carried out so that a charging pressure of the second exhaust gas turbocharger is limited to lie below a pumping limit of the compressor of the second exhaust gas turbocharger during high acceleration of the second exhaust gas turbocharger and when the bypass air valve is open. Thus, an undesirable pumping of the compressor of the second exhaust gas turbocharger, which is not electrically assisted, can be prevented by opening the bypass air valve when the compressor is decoupled from the supercharging process by closing the valve.

The electric drive device of the first electrically assisted exhaust gas turbocharger may be energized until it reaches its maximum electrically assisted exhaust gas turbocharger rotational speed or a different application limit of the exhaust gas turbocharger system is reached. The electric drive device subsequently is deactivated, the valve is opened and the bypass air valve is closed.

The bypass air valve may be closed with a time delay in relation to the opening of the valve to reduce the production of noise when the compressor of the second exhaust gas turbocharger is switched on again.

Further features and advantages of the present invention will become clear with reference to the description below of a preferred exemplary embodiment and to the attached drawing.

BRIEF DESCRIPTION OF THE DRAWING

FIG. 1 is a highly schematic simplified illustration of an exhaust gas turbocharger system for a multi-row internal combustion engine.

DETAILED DESCRIPTION

The exhaust gas turbocharger system 1 is realized in a bi-turbo design and comprises a first exhaust gas turbocharger 2 and a second exhaust gas turbocharger 3 that are arranged parallel to each other. The first exhaust gas turbocharger 2 has an exhaust gas turbine 20 that is accommodated within an exhaust tract of the internal combustion engine, and a compressor 21 that is arranged within an air intake tract of the internal combustion engine. The exhaust gas turbine 20 and the compressor 21 are connected mechanically to each other via a common shaft 22. The second exhaust gas turbocharger 3 also has an exhaust gas turbine 30 within the exhaust tract and a compressor 31 within the air intake tract of the internal combustion engine. The exhaust gas turbine 30 and the compressor 31 are connected mechanically to each other by a common shaft 32.

During operation, hot exhaust gases of the internal combustion engine flow into the exhaust gas turbines 20, 30 of the two exhaust gas turbochargers 2, 3 of the exhaust gas turbocharger system 1. Some of the thermal energy contained in the exhaust gas mass flow is converted into mechanical energy within the two exhaust gas turbines 20, 30 by the exhaust gas turbines 20, 30 being set into rotation. The torque of the exhaust gas turbine 20 of the first exhaust gas turbocharger 2 is transferred via the shaft 22 to the compressor 21 of the first exhaust gas turbocharger 2 to set the compressor 21 into a rotational movement. In an analogous manner, the torque of the exhaust gas turbine 30 of the second exhaust gas turbocharger 3 is transmitted via the shaft 32 to the compressor 31 of the second exhaust gas turbocharger 3. The compressor 31 of the second exhaust gas turbocharger 3 likewise is set into rotation.

An air filter 4, 5 is connected upstream of each respective compressor 21, 31 in the air intake tract of the internal combustion engine. The two air filters 4, 5 are designed to filter the fresh air supplied to the compressors 21, 31. The filtered fresh air is compressed by the two rotating compressors 21, 31 of the exhaust gas turbochargers 2, 3. The compressed air, in each case, flows under high pressure through a pressure line 15, 16 that is connected on the outlet side to the compressors 21, 31, into a common air supply line 6, in which a throttle valve 7 is arranged. A first pressure line 15 therefore is assigned to the compressor 21 of the first exhaust gas turbocharger 2 and a second pressure line 16 is assigned to the compressor 31 of the second exhaust gas turbocharger 3. If the throttle valve 7 is at least partially open, the compressed, pressurized air flows into the internal combustion engine and is thereby available to the combustion process.

Fresh air supplied to the two compressors 21, 31 is heated by the compression process. Thus, a charge air cooler 8, 9 is arranged in the flow direction downstream of each of the respective compressors 21, 31 between the pressure lines 15, 16 and the air supply line 6 leading into the internal combustion engine. The compressor 21 of the first exhaust gas turbocharger 2 is assigned a first charge air cooler 8. Correspondingly, the compressor 31 of the second exhaust gas turbocharger 3 is assigned a second charge air cooler 9. The two charge air coolers 8, 9 are configured to cool the air compressed by the compressors 21, 31. An increase in the density of the air is associated with the temperature reduction, and therefore an overall greater amount of air can be supplied to the internal combustion engine.

A first bypass line 40 with a bypass valve 41 is provided in the exhaust tract of the internal combustion engine to permit power regulation on the exhaust-gas side of the exhaust gas turbine 20 of the first exhaust gas turbocharger 2. Furthermore, a second bypass line 42 with a bypass valve 43 is provided in the exhaust tract of the internal combustion engine. Therefore power regulation on the exhaust-gas side of the exhaust gas turbine 30 of the second exhaust gas turbocharger 3 is made possible.

The first exhaust gas turbocharger 2 is designed to be electrically assisted and has an electric drive device 10 which, in the exemplary embodiment shown here, is arranged on an air supply side of the compressor 21. Alternatively, the electric drive device 10 can also be arranged between the exhaust gas turbine 20 and the compressor 21 of the first exhaust gas turbocharger 2. The electric drive device 10 can be switched on at low rotational speeds of the internal combustion engine and can generate an assisting torque that can additionally drive the rotational movements of the exhaust gas turbine 20 and of the interconnected compressor 21 of the first exhaust gas turbocharger 2. In contrast, at high rotational speeds of the internal combustion engine, the electric drive device 10 of the first exhaust gas turbocharger 2 is no longer energized and is therefore passive. The first exhaust gas turbocharger 2 then is driven exclusively by the hot exhaust gas mass flow.

On the outlet side, a valve 11 is arranged in the second pressure line 16 between the compressor 31 of the second exhaust gas turbocharger 3 and the second charge air cooler 9. The valve 11 can be an automatically closing nonreturn valve or as a selectively activatable or deactivatable compressor switch-on valve. For as long as the electric drive device 10 of the first exhaust gas turbocharger 2 is not activated (i.e. is passive), the operating conditions of the exhaust gas turbocharger system 1 correspond to those of a conventional bi-turbo operation. The valve 11, which is arranged within the second pressure line 16 between the compressor 31 of the second exhaust gas turbocharger 3 and the second charge air cooler 9 is open. This gives rise to the charging pressure of the first exhaust gas turbocharger 2 corresponding to the difference between the charging pressure of the second exhaust gas turbocharger 3 and the pressure loss that results through the valve 11.

If the electric drive device 10 of the first exhaust gas turbocharger 2 is energized, in particular at low rotational speeds and a high load of the internal combustion engine, and thus is activated, the first exhaust gas turbocharger 2 builds up a higher charging pressure than the second exhaust gas turbocharger 3, which is not electrically assisted. The valve 11, which is designed as a nonreturn valve or as a compressor switch-on valve, is closed and thereby prevents a charging pressure loss with respect to the second exhaust gas turbocharger 3, which is not electrically assisted. The charging pressure of the first exhaust gas turbocharger 2 is increased by the electrical assistance and leads to an increased exhaust gas mass flow, which benefits the exhaust gas turbines 20, 30 of the two exhaust gas turbochargers 2, 3. As a result, not only is the rotational speed of the first exhaust gas turbocharger 2, but the rotational speed of the second exhaust gas turbocharger 3 also is increased.

The turbocharging system 1 should avoid having the compressor 31 of the second exhaust gas turbocharger 3 build up a charging pressure against the valve 11, which is closed in this operating state, and should avoid pumping with a mass flow of zero in an extreme manner. Accordingly, the second exhaust gas turbocharger 3 has a bypass air line 12 that branches from the second pressure line 16 on the outlet side downstream of the compressor 31 and has a switchable bypass air valve 13. Furthermore, an aperture 14 in the bypass air line 12 is opened or closed selectively by the switchable bypass air valve 13. The aperture 14 preferably has a constant flow cross section that is selected so that the aperture 14 only permits a charging pressure of a magnitude such that the charging pressure still just lies below the pumping limit of the compressor 31 of the second exhaust gas turbocharger 3. However, the charging pressure also must not be so low that the second pressure line 16 already is prestressed upon repeated opening of the valve 11 and therefore switching on again of the compressor 31 of the second exhaust gas turbocharger 3 of the supercharging process. An aperture 14 with a correspondingly coordinated fixed flow cross section has the advantage of being be produced very simply and cost effectively. In an alternative embodiment, the aperture 14 has a variable flow cross section so that the bypass valve 13 operates in a cross-sectionally variable manner. The bypass air valve 13 is connected to an actuator 17 configured to open or to close the bypass air valve 13 according to requirements. In this case, the actuator 17 is a pneumatic control capsule connected to a clock valve 18. The actuator 17 also can be electric.

To avoid pumping and the resulting impairments of the acoustics of the motor vehicle and of the service life of the components of the second exhaust gas turbocharger 3, a defined relationship of mass flow and pressure ratio is set via the compressor 31, which is to be accelerated, of the second exhaust gas turbocharger 3 during the acceleration of the second exhaust gas turbocharger 3 so that the operating points of the compressor 31 lie outside the pumping limit. To set the mass flow and the pressure ratio, the bypass air valve 13 is provided with the aperture 14 within the bypass air line 12. The flow cross section is selected by means of the aperture 14, which is connected upstream of the bypass air valve 13, to be so small that precisely that pressure ratio and that mass flow are set via the open bypass air valve 13 that are required to always displace the operating points of the compressor 31 of the second exhaust gas turbocharger 3 downstream of the pumping limit and therefore to avoid undesirable pumping. The air flowing through the bypass air line 12 flows via an air line 19 into the second air filter 9 when the bypass air valve 13 is open.

The electric drive device 10 of the first electrically assisted exhaust gas turbocharger 2 is energized during the further course of activation until the exhaust gas turbocharger has accelerated to its maximum electrically assisted exhaust gas turbocharger rotational speed or a different limit of the exhaust gas turbocharger system 1 is reached. Shortly before the end of the activation of the electrical assistance of the first exhaust gas turbocharger 2 is reached, a torque reserve (late ignition) has to be set to initiate a gentle torque profile of the internal combustion engine during the opening of the valve 11 and the resulting switching on again of the compressor 31 of the second exhaust gas turbocharger 3. For noise reasons, the bypass air valve 13 within the bypass air line 12 can be closed with a time delay in relation to the opening of the valve 11.

The exhaust gas turbocharger system 1 prevents an operation where the second exhaust gas turbocharger 3, which is decoupled from the first exhaust gas turbocharger 2 during operation of the electric drive device 10 the second exhaust gas turbocharger 3, is switched on again, and the compressor 31 of the second exhaust gas turbocharger 3 that is to be switched on in this step does not start pumping.

What is claimed is:

1. An exhaust gas turbocharger system for a multi-row internal combustion engine, comprising:
    a first exhaust gas turbocharger and a second exhaust gas turbocharger that are arranged parallel to each other, wherein each of the exhaust gas turbochargers has an exhaust gas turbine and a compressor connected thereto for compressing sucked-in fresh air,
    a first pressure line connected to an outlet side of the compressor of the first exhaust gas turbocharger such that the fresh air compressed by the compressor can flow into the first pressure line, and
    a second pressure line connected on the outlet side to the compressor of the second exhaust gas turbocharger so that the fresh air compressed by said compressor can flow into the second pressure line and the second pressure line having no connection to an inlet to the first gas turbine,
    wherein the first and second pressure lines are connected to each other in terms of flow, wherein the exhaust gas turbocharger system includes:
    an electric drive device that can be switched on and is connected to the first exhaust gas turbocharger for providing additional torque for driving the exhaust gas turbine and the compressor of the first exhaust gas turbocharger,
    a nonreturn valve arranged within the second pressure line and configured for preventing a flow of the fresh air compressed by the compressor of the first exhaust gas turbocharger from flowing through the second pressure lines and to the second exhaust gas turbocharger when the electric drive device is switched on,
    a bypass air line that branches off from the second pressure line on the outlet side downstream of the compressor of the second exhaust gas turbocharger and upstream of the nonreturn valve, the bypass air line having a switchable bypass air valve with a valving element for selectively opening or closing the switchable bypass air line, wherein the nonreturn valve is closed for separating the flow connection between the first and second pressure lines when the electric drive device of the first exhaust gas turbocharger is switched on, and also opening the bypass air valve when the electric drive device of the first exhaust gas turbocharger is switched on, and
    an aperture in the valving element of the bypass air valve for setting a flow cross section, the aperture being configured to limit a charging pressure of the second exhaust gas turbocharger during high acceleration of the second exhaust gas turbocharger and when the bypass air valve is open, so that the charging pressure lies below a pumping limit of the compressor of the second exhaust gas turbocharger.

2. The exhaust gas turbocharger system of claim 1, wherein the aperture has a fixed or a variable flow cross section.

3. The exhaust gas turbocharger system of claim 1, wherein the bypass air valve comprises an actuator configured for selectively opening or closing the bypass air valve.

4. The exhaust gas turbocharger system of claim 1, further comprising an air line extending from the bypass air valve to an air filter upstream of the second compressor for allowing airflow to the air filter when the bypass valve is open.

5. A method of operating the exhaust gas turbocharger system of claim 1, comprising: limiting a charging pressure of the second exhaust gas turbocharger to a value below a pumping limit of the compressor of the second exhaust gas turbocharger during high acceleration of the second exhaust gas turbocharger and when the bypass air valve is open.

6. The method of claim 5, further comprising energizing the electric drive device of the first exhaust gas turbocharger until it reaches its maximum electrically assisted exhaust gas turbocharger rotational speed or until a different application limit of the exhaust gas turbocharger system is reached, and subsequently deactivating the electric drive device, opening the nonreturn valve and closing the bypass air valve.

7. The method of claim 6, further comprising closing the bypass air valve with a time delay in relation to the opening of the nonreturn valve.

* * * * *